United States Patent [19]

Mizuno et al.

[11] Patent Number: 4,892,855

[45] Date of Patent: Jan. 9, 1990

[54] CATALYST AND METHOD FOR PRODUCING METHANOL FROM HYDROGEN AND CARBON MONOXIDE

[75] Inventors: Koichi Mizuno, Tsukuba; Masahiro Saito, Kawaguchi; Tadao Takahashi, Kitasoma; Reize Aizawa, Ushiku, all of Japan

[73] Assignee: Director-General of Agency of Industrial Science and Technology, Japan

[21] Appl. No.: 238,058

[22] Filed: Aug. 30, 1988

[30] Foreign Application Priority Data

Nov. 6, 1987 [JP] Japan ................................. 62-281399

[51] Int. Cl.$^4$ ............................................. B01J 27/138
[52] U.S. Cl. ...................................... 502/200; 502/226; 502/230
[58] Field of Search ........................ 502/226, 230, 200

[56] References Cited

U.S. PATENT DOCUMENTS

| 3,936,383 | 2/1976 | Daimon et al. | 423/326 |
| 4,045,241 | 8/1977 | Daimon et al. | 423/331 |
| 4,065,380 | 12/1977 | Swift et al. | 502/258 |
| 4,582,944 | 4/1986 | Taniguchi et al. | 568/637 |

FOREIGN PATENT DOCUMENTS 0142541  11/1980  Japan .................................. 502/226

Primary Examiner—Patrick P. Garvin
Assistant Examiner—E. D. Irzinski
Attorney, Agent, or Firm—Lorusso & Loud

[57] ABSTRACT

Methanol is produced by contacting a mixed gas containing hydrogen and carbon monoxide with a catalyst which includes a carrier formed of a taeniolite, and a catalytic component containing palladium and carried by the carrier at an elevated temperature.

4 Claims, No Drawings

CATALYST AND METHOD FOR PRODUCING METHANOL FROM HYDROGEN AND CARBON MONOXIDE

BACKGROUND OF THE INVENTION

This invention relates to a novel catalyst useful for converting hydrogen and carbon monoxide into methanol and to a method of the preparation of methanol using same.

Well known method for the production of methanol includes contacting a mixed gas containing hydrogen and carbon monoxide, such as a synthesis gas obtained from coal, coke, natural gas or petroleum, with a catalyst which includes a carrier, such as silica gel or lanthanum oxide, and a catalytic metal component, such as zinc oxide, cromium oxide, copper or palladium, supported on the carrier.

Such a conventional methanol production catalyst, however, has a problem of its low catalytic activity.

SUMMARY OF THE INVENTION

The present invention provides a catalyst which comprises a carrier formed of a taeniolite, and a catalytic component including palladium and carried by the carrier.

The carrier is preferably a synthetic mica having the formula:

$$LiMg_2LiSi_4O_{10}F_2$$

and the catalytic component is preferably palladium ammine complex ion of the formula $[Pd(NH_3)_4]^{2+}$ which is ion-exchanged with the lithium atoms of the synthetic mica.

In another aspect, the present invention is directed to a method of producing methanol using the above catalyst.

It is the prime object of the present invention to provide a novel catalyst for the production of methanol from a mixed gas containing hydrogen and carbon monoxide, which has a high catalytic activity.

Another object of the present invention is to provide a catalyst of the above-mentioned type which exhibit a high methanol producing rate per unit amount thereof and a high selectivity to methanol.

It is a further object of the present invention to provide a catalyst of the above-mentioned type which has a strong resistance to poisoning by sulfur contained in the mixed gas feed.

It is a further object of the present invention to provide a method by which a mixed gas containing hydrogen and carbon monoxide can be converted into methanol with a high yield.

Other objects, features and advantages of the present invention will become apparent from the detailed description of the invention to follow.

DETAILED DESCRIPTION OF THE INVENTION

The novel catalyst according to the present invention includes a taeniolite used as a carrier for carrying a catalytic component. As the carrier, both natural and synthetic taeniolite may be used. Taeniolite may be expressed by the general formula:

$$MMg_2LiSi_4O_{10}F_2$$

wherein M represents an alkali metal such as K, Na or Li. A synthetic Li-taeniolite having the formula $LiMg_2LiSi_4O_{10}F_2$ is especially suitably used. Such a synthetic taeniolite is commercially available.

The catalytic component to be carried by the taeniolite carrier includes palladium. Illustrative of suitable palladium-containing catalytic components are metallic palladium such as palladium black or palladium carbon, palladium complexes or salts such as tetraamminepalladium chloride, lithium tetrachloropalladate, sodium tetrachloropalladate, tetrakistriphenylphosphine palladium, tetrakistriphenylarsine palladium, dibenzylideneacetone palladium, carbonyltristriphenylphosphine palladium, maleic anydride-bis-triphenylphophine palladium, dichlorobistriphenylphosphine palladium, dichlorobistri-(p-methoxyphenyl)phosphine palladium, dichlorobistributylphosphine palladium, dichlorobisdiphenylethylphosphine palladium, dichloro-bistricyclohexylphosphine palladium, dichlorobisbenzonitrile palladium, dibromobistriphenylphosphine palladium, chloropropenyl palladium, dichlorobiscyanobenzene palladium, dichloro-1,4-bis(diphenylphosphino)butane palladium, dichlorobistriphenylarsine palladium, dibromobistriphenylarsine palladium, dichloro-1,1'-bisdiphenylphosphinoferrocene palladium, dichloro-1,1'-bisdiphenylarsinoferrocene palladium, dichloro-α,ω-bisdiphenylphosphinoalkane palladium (wherein the alkane is linear or branched and has a carbon number of 1–10), dichloro-α,α-diphenylphosphino-o-xylene palladium, palladium chloride, palladium oxide, palladium acetate, bisacetatobistriphenylphosphine palladium, iodophenylbistriphenylphosphine palladium, iodo-p-tolylbistriphenylarsine palladium, chlorobenzoylbistriphenyl-phosphine palladium, iodomethylbistributylphosphine palladium, dimethyldiphenylphosphinoethane palladium and dihydrideobistricyclohexylphosphine palladium.

These catalytic components may be supported on the carrier by any known manner such as by a method including immersing the carrier in a solution or a dispersion containing the catalytic component, and drying the carrier impregnated with the solution or dispersion as such, or a method including contacting the taeniolite carrier with a solution containing palladium-containing ion for ion-exchanging the ion-exchangeable cation M of the taeniolite carrier with palladium-containing ion, and washing the resulting carrier with water.

One preferred catalyst according to the present invention is a synthetic Li-taeniolite having at least a portion of its lithium ion-exchanged by palladium ammine complex ion. Such a catalyst may be easily obtained by contacting the synthetic taeniolite having the above formula with an aqueous solution of a palladium ammine complex such as $[Pd(NH_3)_4]Cl_2$ so as to ion-exchange the lithium ion with $[Pd(NH_3)_4]^{2+}$. Another preferred catalyst according to the present invention is a synthetic Li-taeniolite supporting thereon sodium or lithium tetrachloropalladate. This catalyst may be easily obtained by impregnating the taeniolite with a solution containing the palladate, followed by drying.

The palladium-carrying catalyst thus prepared may be used as such or after calcined at a temperature of 100°–400° C. in air or in the atmosphere of hydrogen.

The amount of the catalytic component in the catalyst is generally 0.1–30% by weight, preferably 1–10% by weight. The catalyst of the present invention may be in the form of powder, granules, pellets or any other shape.

In producing methanol, a mixed gas containing hydrogen and carbon monoxide is contacted with the catalyst, which may be arranged to form, for example, a fixed bed or in a fluidized bed, at a temperature of 100°–350° C., preferably 200°–300° C. and a pressure of 1–200 atm., preferably 10–50 atm.

The following example will further illustrate the present invention.

EXAMPLE 1

Commercially available synthetic taeniolite powder having the formula $LiMg_2LiSi_4O_{10}F_2$ (manufactured by Topy Industry Co., Ltd.) was immersed in an aqueous solution of $[Pd(NH_3)_4]Cl_2$ so as to ion-exchange the lithium ion of the taeniolite with $[Pd(NH_3)_4]^{2+}$, thereby obtaining a palladium-bearing catalyst having a palladium content of 1% by weight in terms of elemental palladium.

The catalyst (1 g) was packed in a quartz glass tube, through which a mixed gas containing hydrogen and carbon monoxide (molar ratio of $H_2$ to CO was 2:1) was fed at a temperature of 250° C. and a pressure of 30 atm. with a space velocity of 37.5 ml·[min·g(cat)]$^{-1}$ (37.5 ml per minute per 1 g catalyst). The rate of the production of methanol was found to be 5.45 μmol·[min·g(cat)]$^{-1}$ (i.e. 5.45 μmol of methanol was produced per minute using 1 g of the catalyst). The rate of the production of methane was 0.12 μmol·[min·g(cat)]$^{-1}$. The selectivity to methanol was thus 97.8%.

EXAMPLE 2

In a manner similar to Example 1, another taeniolite catalyst having a palladium content of 3% by weight was prepared. Using this catalyst, methanol was produced in the same manner as that in Example 1. The rates of the production of methanol and methane were found to be 17.50 and 0.16 μmol·[min·g(cat)]$^{-1}$. The methanol selectivity was 99.1%.

EXAMPLE 3

Commercially available synthetic taeniolite powder having the formula $LiMg_2LiSi_4O_{10}F_2$ (manufactured by Topy Industry Co., Ltd.) was immersed in an aqueous solution of $Li_2PdCl_4$ contained in an evaporating dish. The mixture in the dish was then heated to dryness, thereby obtaining a taeniolite catalyst having a palladium content of 2% by weight in terms of elemental palladium. Using the thus obtained catalyst, methanol was produced in the same manner as that in Example 1. The rate of producing methanol and methanol selectivity were found to be satisfactory.

COMPARATIVE EXAMPLE 1

$SiO_2$ (ID gel manufactured by Fuji Davidson Co., Ltd.) was immersed in a $PdCl_2$ aqueous solution in an evaporation dish and the solution was gradually evaporated to dryness. The resulting solids were calcined at 500° C. to obtain a catalyst having Pd content of 1% by weight. In a manner similar to Example 1, methanol was produced using this catalyst. The rate of the production of methanol was found to be 2.05 μmol·[min·g(cat)]$^{-1}$ and the methanol selectivity was 98.7%.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What I claim is:

1. A catalyst comprising a carrier of Li-taeniolite having the formula:

$$LiMg_2LiSi_4O_{10}F_2$$

and a catalytic component including palladium and carried by said carrier.

2. A catalyst as set forth in claim 1, wherein the amount of said catalytic component is 0.1–30% by weight in terms of elemental palladium based on the weight of the catalyst.

3. A catalyst as set forth in claim 1, wherein said catalytic component is palladium ammine complexion of the formula $[Pd(NH_3)_4]^{2+}$ and is ion-exchanged with an ion-exchangeable cation of said taeniolite.

4. A catalyst as set forth in claim 1, wherein said catalytic component is $Li_2PdCl_4$ or $Na_2PdCl_4$.

* * * * *

UNITED STATES PATENT AND TRADEMARK OFFICE
CERTIFICATE OF CORRECTION

PATENT NO. : 4,892,855

DATED : January 9, 1990

INVENTOR(S) : MIZUNO et al

It is certified that error appears in the above-identified patent and that said Letters Patent is hereby corrected as shown below:

IN THE CLAIMS:

Col. 4, line 41, "complexion" should read --complex ion--.

Signed and Sealed this

Eighth Day of January, 1991

Attest:

HARRY F. MANBECK, JR.

*Attesting Officer*  *Commissioner of Patents and Trademarks*